ADDITION CIRCUITS UTILIZING ELECTRICAL DELAY LINES

Filed Aug. 29, 1958 5 Sheets-Sheet 1

INVENTOR.
JOHN H. GALLICHOTTE
BY
Walter J. Madden Jr.
ATTORNEY

Jan. 12, 1960 J. H. GALLICHOTTE 2,920,821

ADDITION CIRCUITS UTILIZING ELECTRICAL DELAY LINES

Filed Aug. 29, 1958 5 Sheets-Sheet 2

United States Patent Office 2,920,821

Patented Jan. 12, 1960

2,920,821

ADDITION CIRCUITS UTILIZING ELECTRICAL DELAY LINES

John H. Gallichotte, Sunnyvale, Calif., assignor to International Business Machines Corporation, New York, N.Y., a corporation of New York Application August 29, 1958, Serial No. 758,078

5 Claims. (Cl. 235—173)

Figure 1:
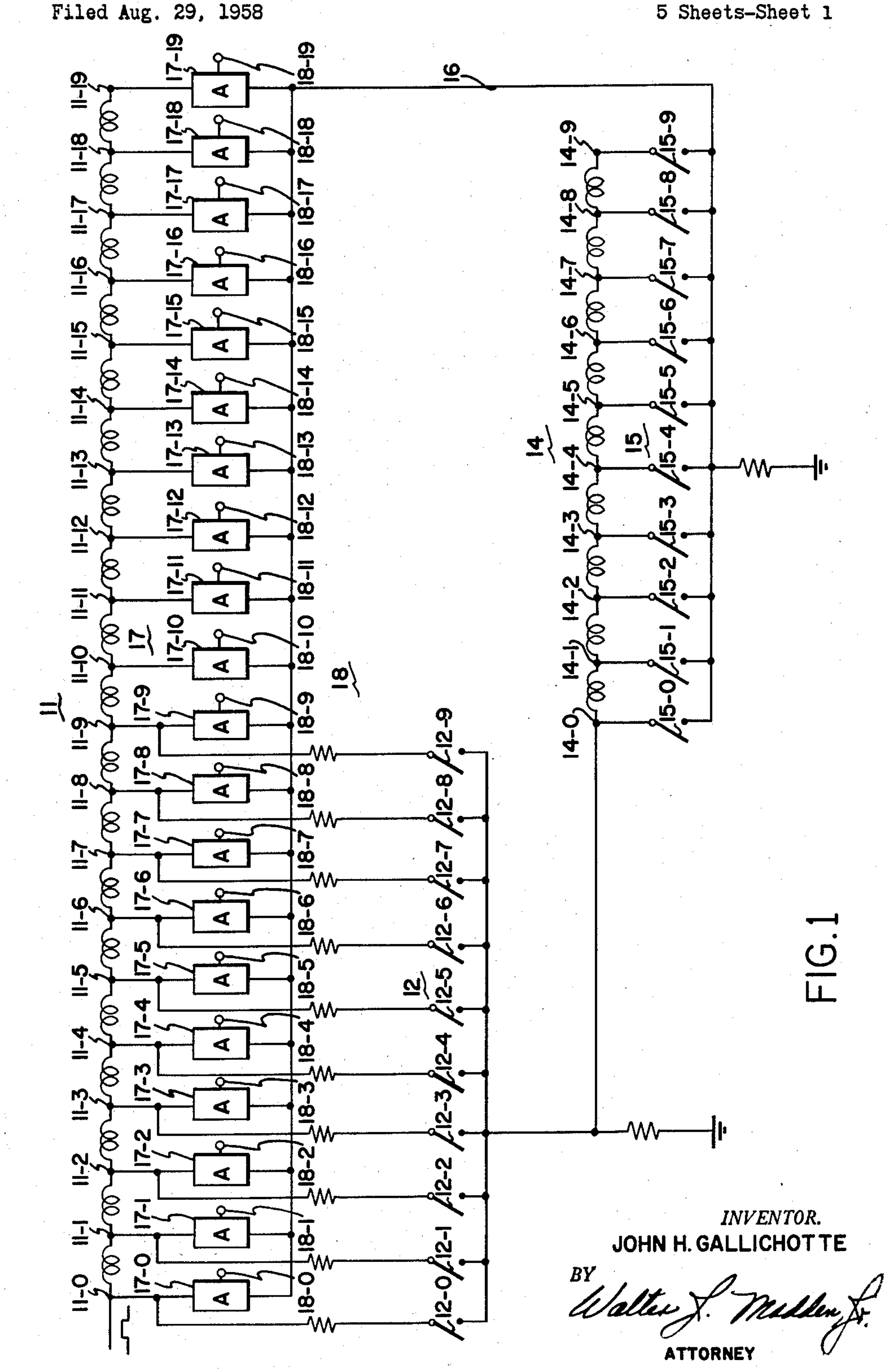

The present invention relates in general to arithmetic circuits and relates more particularly to arithmetic circuits utilizing electrical delay lines.

The use of electrical delay lines to perform various arithmetic operations is disclosed in the co-pending applications of Franklin C. Chiang, Serial Nos. 722,249 and 737,043, assigned to the same assignee as the present application. As disclosed in the above identified Chiang applications, electrical delay lines are utilized to selectively and controllably delay electrical signals by amounts proportional to the numbers involved in the arithmetic operation, so that the total delay of the signal is proportional to a number representing the outcome of the arithmetic operation. For example, in utilizing electrical delay lines to perform addition, an electrical signal is delayed a first amount which is proportional to the augend, and the signal is then further delayed a second amount proportional to the addend, and the total delay undergone by the signal is then determined to provide a measure of the sum of the two numbers. Separate circuitry is provided for each order involved in the arithmetic operation, and carries generated in one order are transferred to the next order to be taken into account in the addition.

In the present invention, there is provided an arithmetic circuit utilizing electrical delay lines and having improved means for introducing carries into the arithmetic operation. In accordance with the present invention, I provide a carry delay line between each of the groups of delay lines or circuits representing the different orders involved in the arithmetic operation. Each of these carry delay lines may introduce an additional delay into the signal to represent the effect of a carry from the prior order. In the case of addition, in the absence of a carry from the preceding order, the carry delay line is by-passed so that the sum signal does not undergo any additional delay in the carry delay line. However, if a carry does exist from the preceding order, the carry delay line introduces into the sum signal an additional delay representing the carry, so that the sum coming out of the carry delay line represents the actual sum, taking into account the carry.

Additionally, the present invention provides improved means for handling carries resulting from carries, i.e., the generation in one order of a carry as a result of a carry from the preceding order, so that the total time required to perform an arithmetic operation is considerably reduced. The apparatus of the present invention operates to produce a true sum in only two cycles. On the first cycle the sums and the carries themselves are generated. The carries may or may not be entered in the sums on the first cycle, depending upon the relative times of occurrence of the sums and the carries. On the second and all subsequent cycles, the carries which were generated but not entered in the first cycle are entered into the first cycle sums to produce true sums, taking into account the effects of carries.

It is therefore an object of the present invention to provide improved apparatus for performing arithmetic operations.

It is an additional object of the present invention to provide improved apparatus for performing arithmetic operations utilizing electrical delay lines.

It is a further object of this invention to provide improved apparatus for performing arithmetic operations in which an electrical signal is delayed by amounts proportional to the numbers involved in the arithmetic operations and the total delay undergone by the signal is detected as a measure of the outcome of the particular arithmetic operation.

It is an additional object of the present invention to provide apparatus for performing arithmetic addition utilizing electrical delay lines in which electrical signals are selectively delayed by amounts proportional to the numbers involved in the addition, and are additionally delayed by amounts corresponding to carries from a preceding order.

Other objects of the invention will be pointed out in the following description and claims and illustrated in the accompanying drawings which disclose, by way of example, the principle of the invention and the best mode which has been contemplated of applying that principle.

Figure 2A:
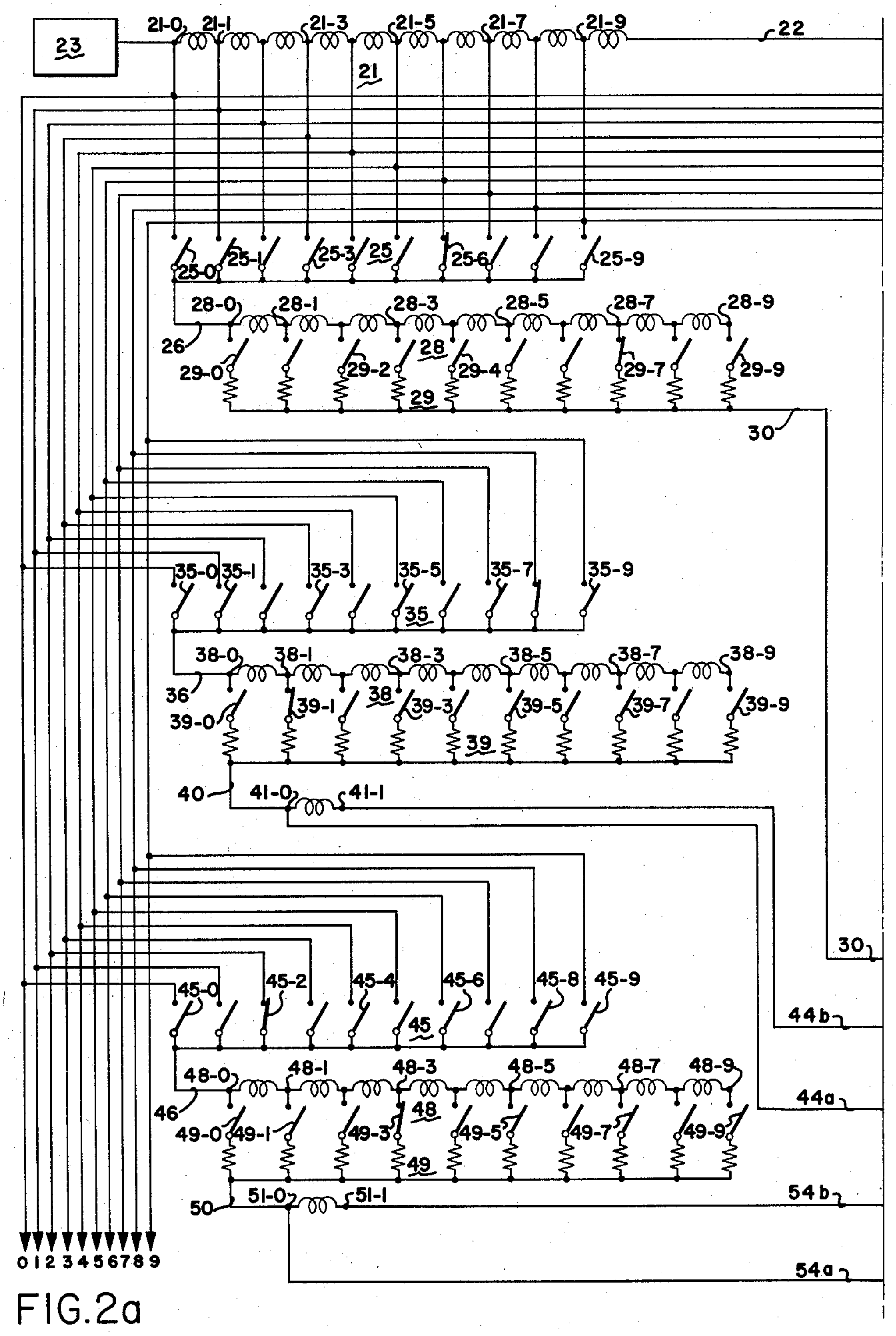
Figure 2B:
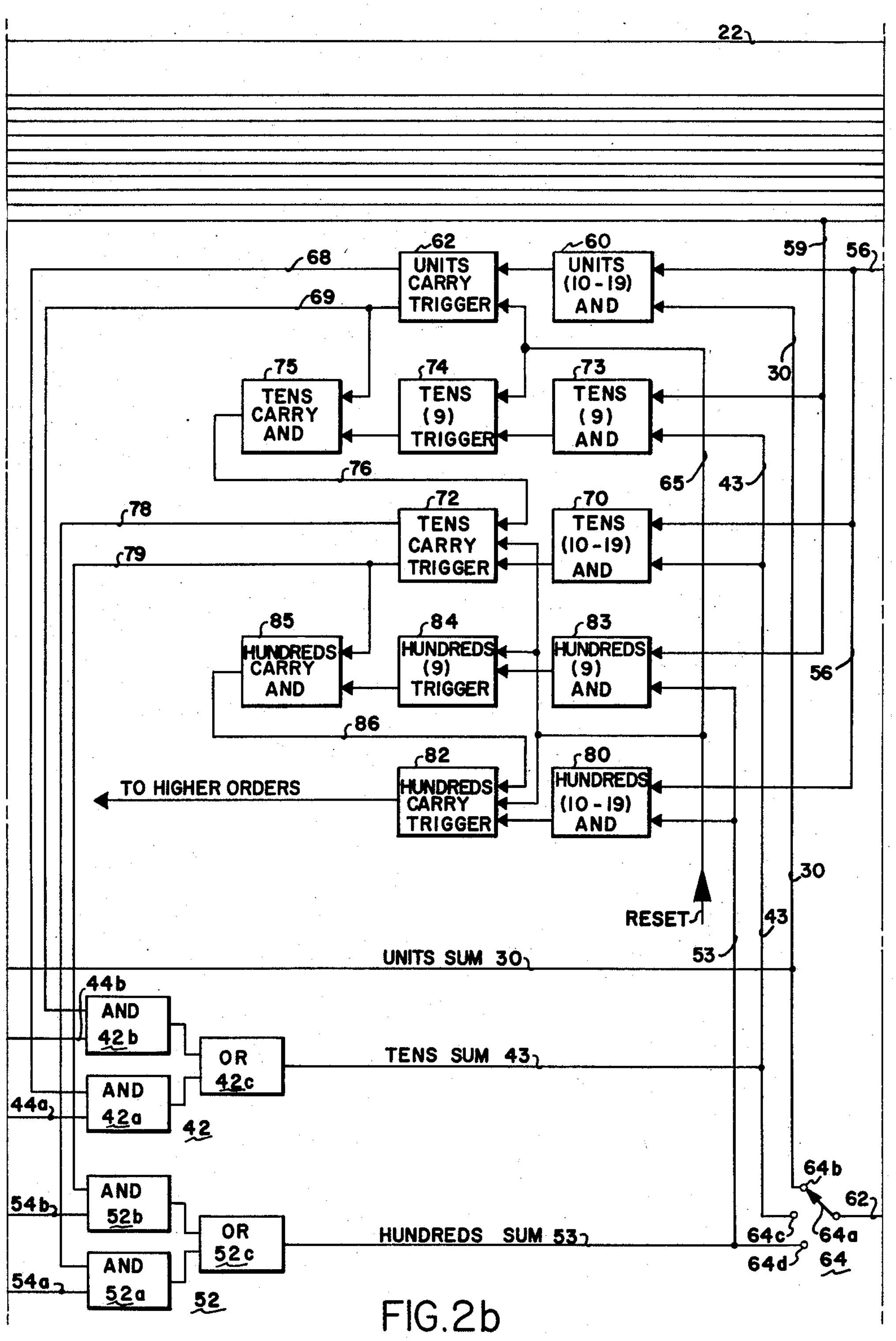
Figure 2C:
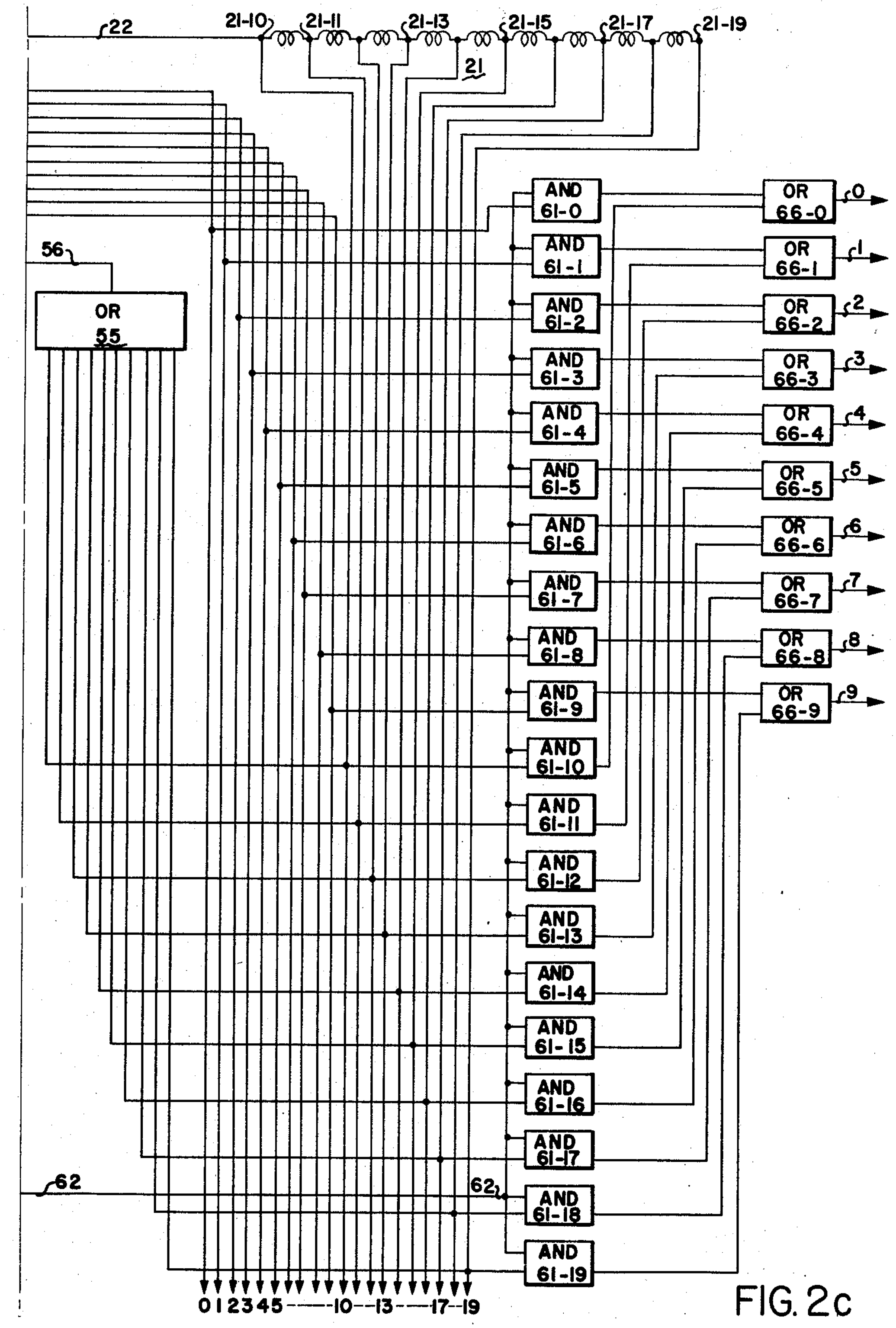
Figure 3:
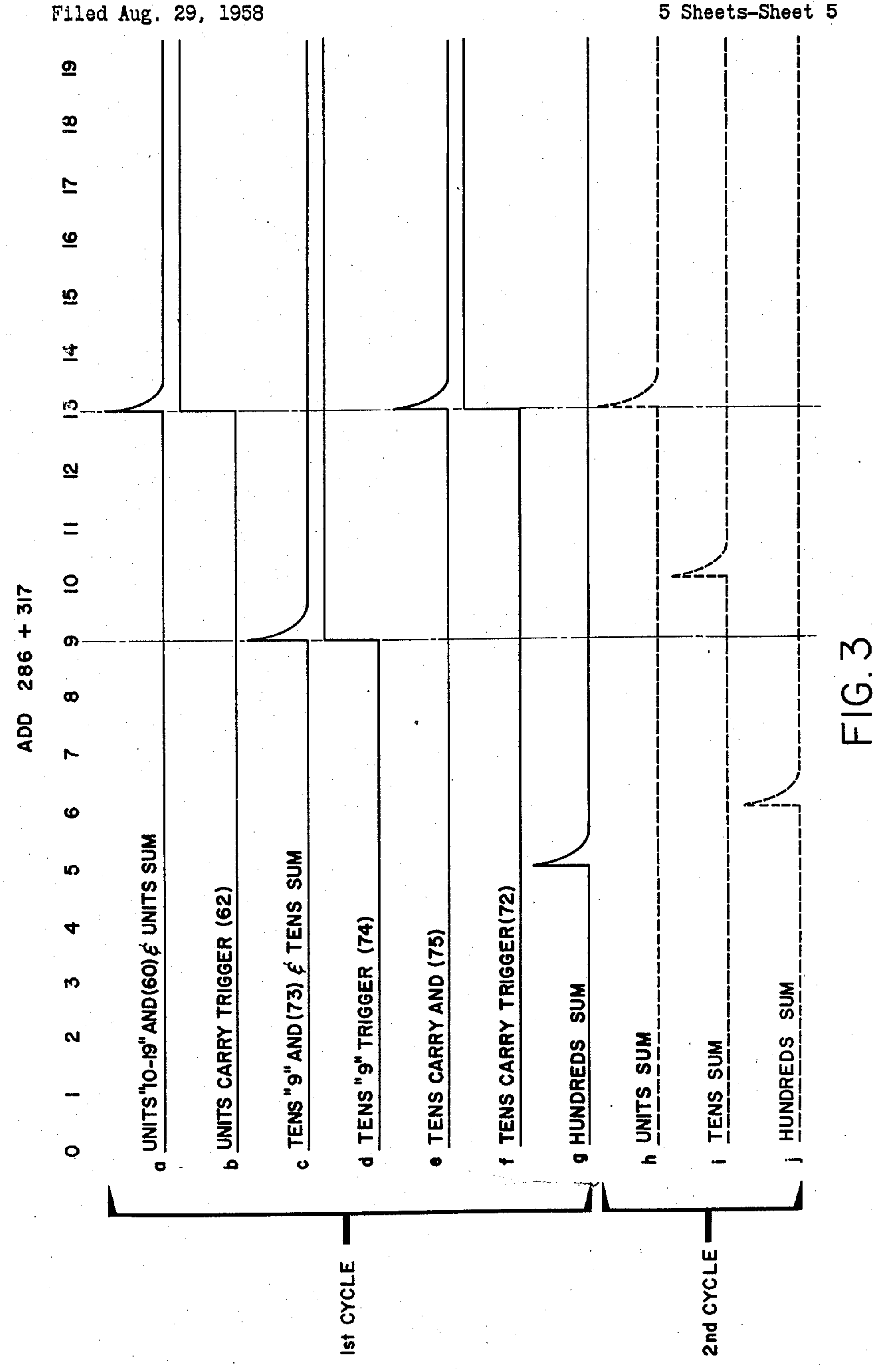

In the drawings:

Fig. 1 diagrammatically illustrates apparatus for performing elementary adding operations with electrical delay lines;

Figs. 2*a*, 2*b* and 2*c*, when laid side by side, illustrate apparatus in accordance with the present invention for performing arithmetic addition in three orders; and Fig. 3 is a series of curves illustrating the relationships between the signals produced in the apparatus of Figs. 2*a*, 2*b* and 2*c* when performing a representative adding operation.

The general principles involved in the use of electrical delay lines in arithmetic circuits can best be understood by referring to the single order adder circuit illustrated in Fig. 1. In Fig. 1 there is shown an electrical delay line 11 having twenty equally spaced taps 11–0 through 11–19 provided therealong. Each of taps 11–0 through 11–9 connects through a corresponding switch 12–0 through 12–9 to the input of a second electrical delay line 14. Delay line 14 is provided with taps 14–0 through 14–9 to provide a number of equal delay sections, each of which is equal to the delay in the sections between adjacent taps of the line 11.

Each of the taps of delay line 14 has connected thereto one terminal of the corresponding one of a series of switches 15–0 through 15–9, and the other terminals of these switches are connected to a common conductor 16. Each of the taps of the delay line 11 connects to one input of a corresponding two input AND unit 17, and the other input to each of these AND units is supplied in common from conductor 16. The output taps of the AND units 17, labeled 18–0 to 18–19 inclusive, are arranged to indicate the sum of the numbers being added, as will be explained more fully below.

The numbers to be added are entered into the apparatus by closing the appropriate ones of the series of switches 12 and 15, the augend being entered in the appropriate switch 12–0 through 12–9, while the addend is entered by closing the appropriate switch 15–0 through 15–9. After closure of the appropriate switches in the augend and addend sections of the apparatus, a pulse is supplied to the input of delay line 11. This input pulse travels through delay line 11 while undergoing equal increments of delay in each of the sections of the delay line. The input pulse will also travel through the closed one of switches 12, then enter delay line 14 and travel therethrough to the closed one of switches 15. After passing through the closed one of switches 15, the pulse will enter conductor 16 and be supplied in parallel to the inputs of AND units 17. At the time of entering conductor 16, the pulse has been delayed an amount corresponding to the sum of the delays determined by the condition of the switches 12 and 15. At the same time, the pulse traveling along the line 11 is at a tap which corresponds to this sum. Thus, there is a coincidence of pulses on only one of the AND units 17, according to the sum of the delays determined by the augend and addend, and only one output tap 18 of the AND units is pulsed.

In operation, assume that it is desired to add 7 to 9. A 9 is entered into the augend switch by closing switch 12–9, and the 7 is entered into the addend section by closing switch 15–7. The input pulse is then supplied to delay line 11, and this pulse travels along the length of the delay line. The pulse also follows a parallel path through switch 12–9, then through a portion of the delay line 14 to the closed switch 15–7, and then through this switch to conductor 16 and back to AND units 17. Since this latter pulse was delayed 9 units in the augend delay line 11 and an additional 7 units in the addend delay line 14, the total delay for this pulse is 16 units at the time it is entered on conductor 16. At this same time the original input pulse to delay line 11 is a tap 11–16, so that there is a coincidence of input pulses on AND unit 17–16. This coincidence permits a pulse to pass through this, and only this, AND unit, thereby entering a signal on the output tap 18–16 of this AND unit to indicate that the sum of the augend and addend, i.e., 9 plus 7, equals 16.

Thus, it will be seen that the addition is performed by summing delays representative of the numbers involved in the arithmetic operation and then detecting the total sum of this delay. It will be understood that the circuitry shown in Fig. 1 is applicable only for single order addition, since no provision is made for carries to other orders, but the apparatus shown in this figure provides a basis for understanding the principles of operation of the circuitry shown in the subsequent drawings.

Reference may now be had to Figs. 2*a*, 2*b* and 2*c* which, when laid side-by-side, illustrate one embodiment of the present invention for adding in three orders, such as units, tens, and hundreds. The apparatus includes a delay line 21 having equal sections therein represented by taps 21–0 through 21–19. To clarify the drawings, sections 21–0 throughout 21–9 (Fig. 2*a*) are shown separated from sections 21–10 through 21–19 (Fig. 2*c*) and connected thereto by a conductor 22, but it will be understood that in practice the delay line may be a unitary structure.

Delay line 21 serves as a master delay line for the apparatus illustrated and has supplied thereto an input pulse from a clock device 23. The pulses supplied from the different output taps of sections 21–0 through 21–9 of delay line 21 are supplied in parallel to the units, tens and hundreds orders of the adding apparatus. The augend selection switches for the units order include a plurality of switches 25–0 through 25–9 for entering the selected augend number in the units order. One terminal of each of these augend selection switches 25 is connected to the corresponding tap on delay line 21, while the other terminals of these switches are connected in common through a conductor 26 to the input of an addend delay line 28. Addend delay line 28 has a plurality of equal delay sections represented by taps 28–0 through 28–9. Each of these taps is connected to one terminal of a corresponding addend selection switch 29–0 through 29–9, and the other terminals of switches 29 are connected in common to a conductor 30 which leads to the sum determining apparatus, as will be described more fully below.

Thus, in summing in the units order, a pulse from clock 23 travels through master delay line 21 to the tap thereof corresponding to the closed one of augend selection switches 25, then through conductor 26 to addend delay line 28, through addend delay line 28 to the tap thereof corresponding to the closed addend selection switch 29, and then through conductor 30 to the sum determining apparatus.

A tens order augend selection switch bank 35 is provided having a plurality of switches 35–0 through 35–9. One terminal of each of these switches is connected to the corresponding tap on delay line 21, in parallel with the switches of units order augend selection switch bank 25. The other terminals of switches 35–0 through 35–9 are connected in common to a conductor 36 which leads to the input of a tens order addend delay line 38 having a plurality of equal sections represented by taps 38–0 through 38–9. An addend delay switch bank 39 having switches 39–0 through 39–9 therein is provided to control the connections of addend delay line 38. One terminal of each of the addend selection switches 39 is connected to the corresponding tap on addend delay line 38, and the other terminals of switches 39 are connected in common to a conductor 40.

Conductor 40 leads to the input of a tens order carry delay line 41 which, in the case of addition, needs only one delay section corresponding to a delay of one unit or section in the master delay line 21. Carry delay line 41 may thus have a pair of output taps 41–0 and 41–1. The connections to the output taps of carry delay line 41 are controlled by suitable means, such as a pair of AND gates 42*a* and 42*b* (Fig. 2*b*). AND gate 42*a* has one input connected to tap 41–0 through a conductor 44*a* and has its other input connected to a trigger circuit to be described below. When signals appear on both inputs to gate 42*a*, the gate is opened to supply a pulse through an OR gate 42*c* to a tens sum conductor 43. AND gate 42*b* has one input connected to tap 41–1 through a conductor 44*b* and has its other input connected to a trigger circuit so that a pulse is supplied through OR gate 42*c* to conductor 43 when two input signals appear on gate 42*b*. With gate 42*a* open, conductor 40 is effectively connected through tap 41–0 and conductor 44*a* directly to conductor 43 leading to the summing circuits, so that the pulse from conductor 40 undergoes no delay in carry delay line 41. When gate 42*b* is open, conductor 40 is effectively connected to conductor 43 through tap 41–1 and conductor 44*b*, so that the pulse from conductor 40 undergoes a delay of one unit in the carry delay line.

For the hundreds order numbers there is provided an augend selection switch bank 45 (Fig. 2*a*) having switches 45–0 through 45–9 which have one terminal connected to the corresponding taps on master delay line 21, in parallel with augend selection switches 25 and 35 for the units and tens orders. The other terminals of switches 45–0 through 45–9 are connected in common to a conductor 46 which is connected to the input of a hundreds order addened delay line 48 having taps 48–0 through 48–9 corresponding to the delay sections therein. An addend selection switch bank 49 has switches 49–0 through 49–9 therein, with one terminal of each of the switches connected to corresponding taps of addend delay line 48. The other terminals of switches 49 are connected in common to a conductor 50 which leads to the input of a hundreds order carry delay line 51. Carry delay line 51, like the tens order carry delay line 41, has two taps 51–0 and 51–1, and the connection of these taps to a conductor 53 is controlled by a pair of AND gates 52*a* and 52*b* and an OR gate 52*c* (Fig. 2*b*). Gates 52*a* receives one input from tap 51–0 through a conductor 54*a* and receives another input from a trigger circuit to be described below, while gate 52*b* receives one input from tap 51–1 through a conductor 54*b* and receives another input from a trigger circuit to be described. Thus, when gate 52*a* is open, the pulse from conductor 50 effectively by-passes carry delay line 51 with no delay, and when gate 52$b$ is open, the pulse undergoes a delay of one unit in carry delay line 51.

From the description of the apparatus thus far it will be seen that there is provided a master delay line 21 through which the master input pulse from clock 23 travels. This pulse also travels in parallel through the different delay line taps to the closed augend selection switches 25, 35 and 45 of the units, tens and hundreds orders, and then through the corresponding addend delay lines 28, 38 and 48 and the closed addend selection switches 29, 39 and 49. Thus, the pulses arriving on conductors 30, 40 and 50 will have been delayed by amounts corresponding to the respective sums of the delays in the units, tens and hundreds orders augend and addend sections. In the case of the tens and hundreds orders, the pulses on conductors 40 and 50 may undergo an additional delay in carry delay lines 41 and 51, respectively, depending upon the conditions of AND gates 42$a$, 42$b$, 52$a$ and 52$b$.

To understand how a measure of the sums represented by the pulses appearing on conductors 30, 40 and 50 is obtained, reference may be had to Figs. 2$b$ and 2$c$. It will be remembered that sections 21–10 and 21–19 of master delay line 21 may, in practice, be a physical part of and continuous with sections 21–0 through 21–9 of this delay line, but for the purpose of clarity, sections 21–10 through 21–19 have been illustrated separately. For detecting the delay undergone by the pulses in the different sections of the adding apparatus of the present invention, there are provided a plurality of coincidence detection circuits shown as AND gates 61–0 through 61–19 (Fig. 2$c$). AND circuits 61 may be of any suitable type in which the simultaneous appearance of pulses on the two inputs thereof produces an output pulse from the device. In the embodiment illustrated, devices 61–0 through 61–19 each receive one input from the associated taps of master delay line 21. That is, coincidence circuit 61–0 receives one input from tap 21–0 of delay line 21, coincidence circuit 61–3 receives one input from tap 21–3 of delay line 21, etc.

The other input to each of AND gates 61–0 through 61–19 is supplied in common from a summing conductor 62 which has supplied thereto a signal representing the pulse whose delay time or sum is to be determined. In the example embodiment illustrated, the different sums are adapted to be read out serially by order, that is, the units sum is read first, then the tens sum and then the hundreds sum. However, it will be understood that the sums may be read out in any desired order, or may be read out simultaneously. In the present case, conductor 62 may be connected by means of the arm 64$a$ of a switch 64 (Fig. 2$b$) to a contact 64$b$ which is connected to conductor 30 of the units sum, to thus connect conductor 30 to conductor 62 and coincidence circuits 61. Switch arm 64$a$ may be moved to engage a contact 64$c$ to connect conductor 43 of the tens orders sum to conductor 62 and coincidence circuits 61. Switch arm 64$a$ is also movable to engage a contact 64$d$ which is connected to conductor 53 of the hundreds order sum to connect this conductor to conductor 62 and coincidence circuits 61. Switch 64 may be of any suitable type, such as a manual switch, but preferably it is a high speed mechanical or electrical switching means which operates to sequentially connect the summing conductors 30, 43 and 53 to the coincidence circuits. In general, the switching speed should be slower than the clock rate so that there is at least one sum signal during the time switch 64 remains in any one position.

The sum pulses from each of the conductors 30, 43 and 53 are sequentially supplied to all the coincidence circuits 61–0 through 61–19, but coincidence occurs only in the particular coincidence circuit which also has as the other input thereof a pulse coincident in time from the master delay line. The particular coincidence circuit which has the two simultaneous inputs produces an output pulse which is supplied to suitable utilization apparatus, such as a visual indicating mechanism or some type of an output device which prints or otherwise produces a record of the sum obtained.

In the embodiment illustrated in the drawings, it has been assumed that the sums are to be produced on a digitized basis, that is, on the basis of a radix of 10. To provide this digitization, there is provided a plurality of OR gates 66–0 through 66–9. These OR gates 66 each receive one input from AND gates 61–0 through 61–9 respectively and one input from the output of AND gates 61–10 through 61–19, respectively. That is, gate 66–0 receives inputs from gates 61–0 and 61–10, gate 66–4 receives inputs from gates 61–4 and 61–14, etc. OR gates 66 are such that they produce an output pulse upon occurrence of an input pulse on either of the two input conductors. Thus, each of OR gates 66 produces an output pulse whenever either of their associated input conductors is energized, so that these output pulses appear whenever there is an output pulse from AND gates 61–0 through 61–19.

In considering the general problem of carries, it will be apparent that carries will be required under two conditions in a multi-order adding operation. One of such conditions occurs when a sum is greater than 9, i.e., from 10 to 19. This, of course, requires a carry of one to the next higher order. The other condition occurs when the sum in a given order is 9 and there is a carry from a prior order into the given order. This carry increases the 9 to a 10, thus producing a carry in the given order which must be passed on to the next higher order.

To provide for carries resulting from sums greater than 9 in the prior order, there is provided a ten input, non-exclusive OR gate 55 (Fig. 2$c$). Device 55, as the name implies, receives ten input signals from the taps 21–10 through 21–19 of delay line 21, respecting numbers from 10 to 19, and produces an output signal on a conductor 56 whenever any of its input conductors are energized. The single output from device 55 is supplied through conductor 56 in parallel to the input of a (10–19) AND gate for each of the orders. Such AND gates include a units AND gate 60 (Fig. 2$b$), a tens order AND gate 70, and a hundreds order AND gate 80. The other inputs to AND gates 60, 70 and 80 are suppplied from the associated summing conductors 30, 43 and 53 for the respective orders. Thus, AND units 60, 70 and 80 will produce output pulses upon the simultaneous appearance of input pulses on the (10–19) conductor 56 and the associated sum conductors for the respective AND units.

The output pulses produced by AND units 60, 70 and 80 are supplied as inputs to carry-triggers 62, 72 and 82, respectively. Triggers 62, 72 and 82 are preferably of the bi-stable type which produce a continuous output signal on one or the other of their output conductors and which are operative to change the energized output conductor upon receipt of an input pulse. Triggers 62, 72 and 82 may be reset by means of a signal supplied from a common reset line 65.

Trigger 62 has two output lines, represented by conductors 68 and 69, which are connected to the respective inputs of AND gates 42$a$ and 42$b$. Conductor 68 is energized when trigger 62 is in a reset state, so that under these conditions a pulse from conductor 40 passes through AND gate 42$a$ and OR gate 42$c$ to conductor 43. When trigger 62 is switched by receipt of a pulse from unit 60, conductor 68 is de-energized and conductor 69 is energized to supply an input to AND gate 42$b$. Thus, pulses from conductor 40 pass through delay line 41 and AND gate 42$b$ to OR gate 42$c$ and conductor 43 when trigger 62 is switched. When reset conductor 65 is energized, trigger 62 de-energizes conductor 69 and again energizes conductor 68.

To provide for carries resulting from carries from the preceding order, there is provided a second series of AND gates 73 and 83. AND gates 73 and 83 each receive one input from a conductor 59 which is connected to the "9" time tap 21–9 of master delay line 21, so that AND gates 73 and 83 each receive an input pulse at "9" time of the master delay time. The other inputs to each of AND gates 73 and 83 are supplied from the associated summing conductors 43 and 53 for the tens and hundreds orders, respectively, so that upon appearance on the tens sum conductor 43 or the hundreds sum conductor 53 of a pulse at "9" time, AND gate 73 or AND gate 83 will produce an output pulse.

The output pulse from AND gate 73 is supplied as the single inputs to a tens (9) trigger 74, and the output pulse from AND gate 83 is supplied as the single input to a hundreds (9) trigger 84. Triggers 74 and 84, when energized by an input pulse, produce a continuous output signal until reset, so that upon appearance of an output pulse from AND gates 73 or 83, the associated one of triggers 74 and 84 produces a continuous output signal. The output signal from trigger 74 is supplied as one input to a tens-carry AND gate 75. The other input to AND gate 75 is supplied from the units-carry trigger 62 by way of conductor 69, so that upon the simultaneous appearance of output signals from triggers 62 and 74, AND gate 75 is energized to produce an output signal which is supplied through a conductor 76 to the input of the tens-carry trigger 72.

Trigger 72 has two output lines, represented by conductors 78 and 79, which are connected to the respective inputs of AND gates 52*a* and 52*b*. Conductor 78 is energized when trigger 72 is in a reset condition, so that under these conditions a pulse from conductor 50 passes through tap 51–0 and gate 54*a* to OR gate 52*c* and conductor 53. When trigger 72 is switched by the simultaneous appearance of output signals from devices 70 and 75, conductor 78 is de-energized and conductor 79 is energized to supply an input to AND gate 54*b*. This opens gate 54*b* so that pulses then pass from conductor 50 through delay line 51 to tap 51–1, gate 54*b* and OR gate 54*c* to conductor 53.

Similarly, hundreds order (9) trigger 84 supplies an output signal to one input of a hundreds-carry AND network 85. The other input to AND network 85 is supplied through conductor 79 from the output of tens-carry trigger 72, so that AND network 85 produces an output pulse upon the simultaneous appearance of input signals from tens-carry trigger 72 and the hundreds (9) trigger 84. The output pulse from AND network 85 is supplied through a conductor 86 as one input to the hundreds-carry trigger 82. Hundreds-carry trigger 82 receives this input, together with an input from the hundreds (10–19) AND gate 80, and is operable to produce an output signal which is continuous until reset. The output from hundreds-carry trigger 82 is supplied, in the case of additional orders being utilized, to the carry delay line control and the corresponding carry AND gate for the next highest order, i.e., the thousands order.

The operation of the present invention can perhaps best be understood by reference to the timing diagram of Fig. 3, illustrating the relationships between the pulses in the different circuits when performing a representative adding operation. In the timing diagram of Fig. 3, it is assumed that an addend of 317 is to be added to an augend of 286. To enter the augend of 286 in the apparatus, switch 45–2 of the hundreds augend selection switch bank, switch 35–8 of the tens augend selection switch bank, and switch 25–6 of the units augend selection switch bank are closed. To enter the addend of 317 into the apparatus, switch 49–3 of the hundreds addend selection switch bank, switch 39–1 of the tens addend selection switch bank, and switch 29–7 of the units addend selection switch bank are closed. After this entering of the augend and addend numbers, clock 23 may be energized to deliver input pulses to the input of master delay line 21.

With respect to the hundreds section, the master clock pulse travels through delay line 21 to tap 21–2, then travels to the closed augend selection switch 45–2 in the hundreds section and then through conductor 46 to the input of addend delay line 48. The pulse then travels through delay line 48 to tap 48–3 thereof, then through the closed addend selection switch 49–3 to conductor 50. The pulse thus arrives at conductor 50, after undergoing a two unit delay in the hundreds augend section and a three unit delay in addend delay line 48, for a total delay of five units. At "5" time in the first cycle, gate 52*a* is open so that the pulse on conductor 50 passes through gates 52*a* and 52*c* to conductor 53 without undergoing any delay in the hundreds carry delay line 51. The pulse is thus supplied from conductor 53 to one input of each of AND gates 80 and 83 at "5" time.

Next considering the tens order augend and addend sections, the master pulse traveling through master delay line 21 will branch off at tap 21–8 of this delay line and flow through the closed tens order augend selection switch 35–8 to conductor 36. From conductor 36 the pulse travels through one section of addend delay line 38 to tap 38–1 and then through the closed addend selection switch 39–1 to conductor 40. At this time, gate 42*a* is open and gate 42*b* is closed, so that the pulse travels directly through conductor 44*a* and gate 42*a* to OR gate 42*c* and conductor 43, thus bypassing the single section of the tens-carry delay line 41. The pulse arriving on conductor 43 thus has been delayed by eight units in the augend section and one unit in the addend section for a total delay of nine units.

This pulse arrives at the input to the tens (9) AND network 73 at "9" time, simultaneously with the arrival at this AND network of a pulse on the (9) conductor 59 from the tap 21–9 of master delay line 21, as shown by the timing diagram of Fig. 3*c*. The simultaneous appearance of two input signals on AND network 73 causes this network to supply an output pulse to fire the tens (9) trigger 74, which at this time produces a continuous output signal, as shown in Fig. 3*d* of the timing diagram. The output from tens (9) trigger 74 is supplied as one input to the tens-carry AND network 75. In this connection it will be noted that at the time of generation of the output signal from trigger 74, i.e., "9" time, the units-carry trigger 62 has not yet been fired, so that at "9" time there is only one input to AND network 75 and hence network 75 does not produce an output pulse at this time.

The pulse on conductor 43, which has been delayed a total of nine units, is also supplied as one input to the tens (10–19) AND gate 70. The other input to this AND network 70 is supplied by way of conductor 56 from the output of OR gate 55. However, since the pulse from conductor 43 arrives at gate 70 at "9" time, whereas no pulses arrive at the other input to gate 70 from conductor 56 before "10" time, there is no coincidence of input pulses on gate 70, and this gate is not opened.

With respect to the units order, the pulse from clock 23 travels through delay line 21 until it reaches tap 21–6, at which time a portion of the pulse leaves the delay line and travels through closed augend selection switch 25–6 to conductor 26 and the input of addend delay line 28. The pulse then travels through delay line 28 until it reaches tap 28–7 from where it goes through closed addend selection switch 29–7 to units sum conductor 30. At this time, the pulse has been delayed by six units in the augend selection portion of delay line 21 and an additional seven units in addend delay line 28, or a total delay of thirteen units. This is shown in the timing diagram of Fig. 3*a*, illustrating the arrival of this pulse on conductor 30, representing the units sum during the first cycle and also representing the input to the units (10–19) AND gate 60, since conductor 30 is connected as one input to AND gate 60.

The portion of the master input pulse from clock 23 which continues on through master delay line 21 thus arrives at tap 21—13 of line 21 simultaneously with the appearance on conductor 30 of the pulse delayed by thirteen units in the units summing section. This pulse from tap 21—13 is supplied through the ten input OR gate 55 to conductor 56 where it is supplied as the other input to the units (10–19) AND gate 60. AND gate 60 thus has two inputs thereon at "13" time, so that it produces an output pulse to the units-carry trigger 62 at this time. Thus, as shown by the timing diagram of Fig. 3*b*, trigger 62 is rendered conductive at "13" time to supply a continuous output signal until it is reset. This continuous output signal from the units-carry trigger 62 is supplied as one input to the tens-carry AND network 75.

Summarizing the operation of the tens and units sections at this time, the tens (9) trigger 74 is fired at "9" time and the output thereof supplied as one input to the tens-carry AND network 75, thus preparing network 75 for the generation of a carrry resulting from a carry if there is a carry produced in the prior order, i.e., the units order. Since this carry from the prior order is produced at "13" time by the units-carry trigger 62, the tens-carry AND network 75 is energized by the simultaneous appearance of two input signals thereon at "13" time to produce an output pulse which is supplied through conductor 76 to the input of the tens-carry trigger 72. Trigger 72 thus fires at "13" time, as shown by the timing diagram of Fig. 3*f*, to de-energize conductor 78 and energize conductor 79.

This action of trigger 72 closes gate **52*a* and opens gate 52*b* to thereafter introduce the delay of delay line 51 in any pulse traveling between conductor 50 and conductor 53. However, it will be noted that since the first cycle pulse on conductor 50 of the hundreds order section passed therethrough at "5" time, while gate 52*a* was open, the generation of the carry from the tens order at "13" time is ineffective to enter this carry into the hundreds sum pulse on conductor 53** during the first cycle of the apparatus and such entering must await the second cycle.

Thus, at the end of the first cycle of the apparatus of the present invention, the sums have been generated in the three orders shown and the carries have been generated. In this particular example, owing to the relative times of generation of the carries, the carries have not been entered in the sums on the first cycle, since these sums occurred prior to generation of the carries. That is, at the end of the first cycle the units orders sum is indicated as 13, which is the correct sum since there is no carry from a preceding order for the units order. For the tens order, on the first cycle the sum is indicated as 9, which is the correct sum for the augend and addend of the tens order but does not take into account the carry from the "13" sum in the units order. Similarly, in the hundreds order at the end of the first cycle, the indicated sum is 5, which is the correct sum for the augend and addend of the hundreds order, but does not take into account the carry from the tens order resulting, in turn, from the carry from the units order. The first cycle sums will be supplied to coincidence circuits 61 which, together with OR gates 66, will produce outputs indicating the values of these sums without carries, but these output indications do not represent the true sums on the first cycle and hence they are not utilized.

The apparatus of the present invention will produce the correct sum on the second and all subsequent cycles, taking into account the effects of carries generated during the first cycle. The second cycle is preferably initiated automatically at the end of the first cycle, since clock 23 may be designed to repetitively produce output pulses having a predetermined frequency. Thus, as the output pulse from clock 23 for the second cycle travels through delay line 21, it again undergoes 13 units of delay in the units delay section, and the sum is indicated as 13 on the second cycle, as shown in Fig. 3*h*. The output sum will, of course, appear as a 3 from OR gate 66–3, where the sum is to be produced on a digitized basis, as in the illustrated embodiment.

For the tens order, the pulse undergoes a delay of 8 units in the addend delay section and 1 unit in the augend delay section, as in the first cycle. However, since AND gate **42*a* closed and AND gate 42*b* opened at "13" time in the first cycle, the second cycle pulse on conductor 40 travels through the single section of delay line 41 to AND gate 42*b* and OR gate 42*c* to conductor 43. Thus, this additional one unit of delay in the tens order carry delay line 41 causes the sum pulse to reach conductor 43 at "10" time, which is the correct sum in the particular operation considering the effect of the carry from the units order. This sum pulse on conductor 43 at "10" time is supplied to coincidence circuits 61, where it coincides in time with the master pulse from tap 21–10 to produce coincidence in device 61–10**, as shown in Fig. 3*i*. This device produces an output to the digitizing OR gate 66–0, representing the proper digit for the sum of the tens order.

In the hundreds order section, the second cycle pulse again undergoes a delay of two units in the augend delay section and a delay of three units in the addend delay section, for a total delay of five units, as in the first cycle. However, since AND gate **52*a* was closed and AND gate 52*b* opened at "13" time in the first cycle, the second cycle pulse on conductor 50 must travel through delay line 51 to gate 52*b*. This hundreds sum pulse on conductor 50 thus undergoes an additional one unit of delay in the hundreds carry delay line 51, so that it arrives on the hundreds sum conductor 53 at "6" time, thus representing the correct sum for the hundreds digits, taking into account the carry from the tens order. This pulse on sum conductor 53 is supplied to coincidence circuits 61 and its arrival at these circuits coincides in time with the arrival at gate 61–6 of the pulse from tap 21–6 of delay line 21, so that gate 61–6 produces an output pulse which is supplied to digitizing OR gate 66–6**.

It will thus be seen that the apparatus of the present invention operates to produce a true sum in only two cycles, regardless of the number of carries involved. On the second and all subsequent cycles, therefore, the apparatus will supply through OR gates 66 signals representing the digits of the sum of the augend and addend, and the apparatus will continue to supply these output signals repetitively until it is reset or until a new set of numbers is entered on the augend and addend switches.

In the above described embodiment the three orders shown were labeled units, tens, and hundreds, respectively, in order to illustrate clearly the operation of the apparatus in performing a representative arithmetic operation. However, it will be understood that the invention is operative to perform addition utilizing any number of orders desired, and that regardless of the number of such orders utilized in the operation the apparatus of the present invention will produce an indication of the sum of these numbers in two cycles, taking into account the effects of carries from preceding orders and entering these carries on the second and all subsequent cycles. Further, although the illustrated embodiment utilized a serial readout of the sums by order, it will be apparent to those skilled in the art that by suitable modification of the apparatus the sums from all orders can be read out simultaneously if desired. Similarly, although the invention has been illustrated in connection with a system employing a radix of ten, it will be apparent that the invention may be utilized in a system which is based on some other radix.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for electrically performing addition of numbers comprising a plurality of groups of electrical delay elements, each of said groups comprising a plurality of discrete delay elements which are selectively controllable to produce a controllable time delay in said group, each of said groups representing a different numerical order in said addition, means for supplying electrical signals to said groups of delay elements, means for delaying said signals in said elements by amounts proportional to the sums of the numbers involved in said addition, means for determining the total delay undergone by said signals in each of said orders for determining said sums, carry delay means for each of said groups of delay elements for introducing into each of said orders an additional delay representing a carry, first carry control means responsive to a sum greater than nine in a given order for energizing said carry delay means to introduce a carry delay into the order following said given order, and second carry control means responsive jointly to a sum of nine in a given order and a carry from the order preceding said given order for energizing said carry delay means to introduce a carry delay into the order following said given order.

2. Apparatus for electrically performing addition of numbers comprising a plurality of groups of electrical delay elements, each of said groups comprising a plurality of discrete delay elements which are selectively controllable to produce a controllable time delay in said groups, each of said groups representing a different numerical order in said addition, means for supplying a clock pulse in parallel to said groups of delay elements, means for delaying said pulse in said elements by amounts proportional to the sums of the numbers involved in said addition, means for determining the total delay undergone by said pulse in each of said orders for determining said sums, carry delay means for each of said groups of delay elements for introducing into each of said orders an additional delay representing a carry, first carry control means responsive to a sum greater than nine in a given order for energizing said carry delay means to introduce a carry delay into the order following said given order, and second carry control means responsive jointly to a sum of nine in a given order and a carry from the order preceding said given order for energizing said carry delay means to introduce a carry delay into the order following said given order.

3. Apparatus for electrically performing addition of numbers having at least one augend digit and one addend digit comprising a plurality of groups of electrical delay elements, each of said groups comprising a plurality of discrete delay elements which are selectively controllable to produce a controllable time delay in said group, each of said groups representing a different numerical order in said addition and each of said groups having an augend section and an addend section, means for supplying a clock pulse in parallel to said groups of delay elements, means for delaying said pulse in each of said augend sections by amounts proportional to the augend digits for each of said orders, means for additionally delaying said pulse in each of said addend sections by amounts proportional to the addend digits for each of said orders, means for determining the total delay undergone by said pulse in each of said orders for determining said sums, carry delay means for each of said groups of delay elements for introducing into each of said orders an additional delay representing a carry, first carry control means responsive to a sum greater than nine in a given order for energizing said carry delay means to introduce a carry delay into the order following said given order, and second carry control means responsive jointly to a sum of nine in a given order and a carry from the order preceding said given order for energizing said carry delay means to introduce a carry delay into the order following said given order.

4. Apparatus for electrically performing addition of numbers having at least one augend digit and one addend digit comprising a plurality of groups of electrical delay elements, each of said groups comprising a plurality of discrete delay elements which are selectively controllable to produce a controllable time delay in said group, each of said groups representing a different numerical order in said addition and each of said groups having an augend section and an addend section, means for supplying a clock pulse in parallel to said groups of delay elements, means for delaying said pulse in each of said augend sections by amounts proportional to the augend digits for each of said orders, means for additionally delaying said pulse in each of said addend sections by amounts proportional to the addend digits for each of said orders, means for comparing the total delay undergone by said pulse in each of said orders with said clock pulse for determining said sums, carry delay means between each of said groups of delay elements for introducing into each of said orders an additional delay representing a carry, first carry control means responsive to a sum greater than nine in a given order for energizing said carry delay means to introduce a carry delay into the order following said given order, and second carry control means responsive jointly to a sum of nine in a given order and a carry from the order preceding said given order for energizing said carry delay means to introduce a carry delay into the order following said given order.

5. Apparatus for electrically performing addition of numbers having at least one augend digit and one addend digit comprising a plurality of groups of electrical delay elements, each of said groups comprising a plurality of discrete delay elements which are selectively controllable to produce a controllable time delay in said group, each of said groups representing a different numerical order in said addition and each of said groups having an augend section and an addend section, means for supplying a clock pulse in parallel to said groups of delay elements, means for delaying said pulse in each of said augend sections by amounts proportional to the augend digits for each of said orders, means for additionally delaying said pulse in each of said addend sections by amounts proportional to the addend digits for each of said orders, a plurality of coincidence circuits for comparing the total delay undergone by said pulse in each of said orders with said clock pulse for determining said sums, carry delay means for each of said groups of delay elements for introducing into each of said orders an additional delay representing a carry, first carry control means responsive to a sum greater than nine in a given order for energizing said carry delay means to introduce a carry delay into the order following said given order, and second carry control means responsive jointly to a sum of nine in a given order and a carry from the order preceding said given order for energizing said carry delay means to introduce a carry delay into the order following said given order.

References Cited in the file of this patent

UNITED STATES PATENTS

| | | |
|---|---|---|
| 2,635,229 | Gloess et al. | Apr. 14, 1953 |
| 2,689,683 | Gloess et al. | Sept. 21, 1954 |
| 2,711,526 | Gloess | June 21, 1955 |
| 2,729,811 | Gloess | Jan. 3, 1956 |
| 2,787,416 | Hansen | Apr. 2, 1957 |